12) United States Patent
Lin et al.

(10) Patent No.: US 10,567,644 B2
(45) Date of Patent: Feb. 18, 2020

(54) IMAGE CAPTURING DEVICE, IMAGE PROCESSING METHOD AND IMAGE PROCESSING DEVICE FOR STITCHING AND BLENDING OPERATIONS (71) Applicant: ABILITY ENTERPRISE CO., LTD., New Taipei (TW)

(72) Inventors: Shiu-Yung Lin, New Taipei (TW); Chung-Chou Wang, New Taipei (TW)

(73) Assignee: ABILITY ENTERPRISE CO., LTD., New Taipei (TW)

( * ) Notice: Subject to any disclaimer, the term of this patent is extended or adjusted under 35 U.S.C. 154(b) by 29 days.

(21) Appl. No.: 16/022,777

(22) Filed: Jun. 29, 2018

(65) Prior Publication Data
US 2019/0007607 A1    Jan. 3, 2019

Related U.S. Application Data (60) Provisional application No. 62/526,438, filed on Jun. 29, 2017.

(51) Int. Cl.
H04N 5/225   (2006.01)
H04N 5/232   (2006.01)
G06T 1/00    (2006.01)
G06T 7/80    (2017.01)
H04N 5/235   (2006.01)
G02B 13/06   (2006.01)

(52) U.S. Cl.
CPC ....... H04N 5/23229 (2013.01); G06T 1/0007 (2013.01); G06T 7/80 (2017.01); H04N 5/2254 (2013.01); H04N 5/2258 (2013.01); H04N 5/235 (2013.01); H04N 5/23238 (2013.01); G02B 13/06 (2013.01)

(58) Field of Classification Search
CPC ............... H04N 5/23229; H04N 5/235; H04N 5/23238; H04N 5/2258; H04N 5/2254; H04N 5/2173; H04N 9/045; H04N 5/262; H04N 5/265; H04N 9/64; G06T 7/80; G06T 1/0007; G06T 3/4038; G06T 3/0012; G02B 13/06
See application file for complete search history.

(56) References Cited

U.S. PATENT DOCUMENTS 10,009,551 B1 * 6/2018 Adcock .................. H04N 5/247
2012/0262607 A1 * 10/2012 Shimura .............. H04N 5/2258
                                                    348/239

(Continued)

Primary Examiner — Hung H Lam
(74) Attorney, Agent, or Firm — McClure, Qualey & Rodack, LLP (57) ABSTRACT An image capturing device includes a first lens module, a second lens module and an operation module. The first lens module and the second lens module capture a first image and a second image respectively. The operator transforms a first section of a first left block of the first image and a second section of a second right block of the second image to a first color space image and a second color space image, obtains a shifting value of a minimum color space distance according to the first color space image and the second color space image, adjusts the width of the first left block and the second right block according to the shifting value of the minimum color space distance, and produces a third image in accordance with the adjusted first image, the adjusted second image and a blending operation.

20 Claims, 7 Drawing Sheets (56) References Cited

U.S. PATENT DOCUMENTS

| | | | |
|---|---|---|---|
| 2014/0362173 A1* | 12/2014 | Doepke | H04N 5/23238 |
| | | | 348/36 |
| 2015/0138312 A1* | 5/2015 | Liu | G06T 3/4038 |
| | | | 348/36 |
| 2016/0125570 A1* | 5/2016 | Macmillan | G06T 3/0068 |
| | | | 348/218.1 |
| 2018/0262683 A1* | 9/2018 | Meler | G06T 3/4038 |
| 2018/0268521 A1* | 9/2018 | Ding | G06T 3/4038 |

\* cited by examiner

IMAGE CAPTURING DEVICE, IMAGE PROCESSING METHOD AND IMAGE PROCESSING DEVICE FOR STITCHING AND BLENDING OPERATIONS

This application claims the benefit of U.S. provisional application Ser. No. 62/526,438, filed Jun. 29, 2017, the subject matter of which is incorporated herein by reference.

BACKGROUND OF THE INVENTION

Field of the Invention

The invention relates to an image capturing device, an image processing method and an image processing device, especially relates to an image capturing device, an image processing method and an image processing device which can integrate/stitch multiple frames of image.

Description of the Related Art

In 1839, the first camera in human history was invented. Since then, people have captured beautiful sceneries and recorded life through cameras. Today, photography has become an important part of modern life. With the development of science and technology, the cooperation of cameras and image processing techniques can take photos with a broader view.

At present, the camera technology has been developed to capture multiple images simultaneously, and integrate the images by post-production to provide a broader view of the image. Under this premise, overlapping regions between multiple images are often stitched. However, for the existing prior art, it is always impossible to ensure that the overlapping regions of two images can be stitched perfectly, even if the junction can be modified as much as possible, defects may still be produced at the junction after the environment of photographing or the object distance is changed.

In view of above, how to provide an image device and an image processing method is one of subjects of the industry.

SUMMARY OF THE INVENTION

To achieve the above purpose, an embodiment of the present invention discloses an image capturing device comprising a first lens module, a second lens module and an operation module. The first lens module captures a first image toward a first direction, and the first image having a first left block. The second lens module captures a second image toward a second direction, and the second image having a second right block. The operation module transforms a first section of the first left block to a first color space image and transforms a second section of the second right block to a second color space image; obtains a shifting value of a minimum color space distance in accordance with the first color space image and the second color space image; adjusts a width of the first left block and a width of the second right block with the shifting value of the minimum color space distance; and sets a first stitching block on the adjusted first left block and setting a second stitching block on the adjusted second right block, and calculates the first stitching block and the second stitching block with a blending operation and produces a third image.

To achieve the above purpose, an embodiment of the present invention discloses an image processing method, for an electronic device having an operation module. The image processing method comprises: providing a first image and a second image to the operation module, the first image having a first left block, and the second image having a second right block; and adopting the operation module to transform a first section of the first left block to a first color space image and to transform a second section of the second right block to a second color space image; to obtain a shifting value of a minimum color space distance in accordance with the first color space image and the second color space image; to adjust a width of the first left block and a width of the second right block with the shifting value of the minimum color space distance; to set a first stitching block for the adjusted first left block and to set a second stitching block on the adjusted second right block; and, to calculate the first stitching block and the second stitching block with a blending operation and to produce a third image.

To achieve the above purpose, an embodiment of the present invention discloses an image processing device, comprising a storage module and an operation module. The storage module, stores at least one first image and at least one second image. The first image has a first left block, and the second image has a second right block. The operation module transforms a first section of the first left block to a first color space image and transforms a second section of the second right block to a second color space image; obtains a shifting value of a minimum color space distance in accordance with the first color space image and the second color space image; adjusts a width of the first left block and a width of the second right block with the shifting value of the minimum color space distance; and sets a first stitching block on the adjusted first left block and setting a second stitching block on the adjusted second right block, and calculates the first stitching block and the second stitching block with a blending operation and produces a third image.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
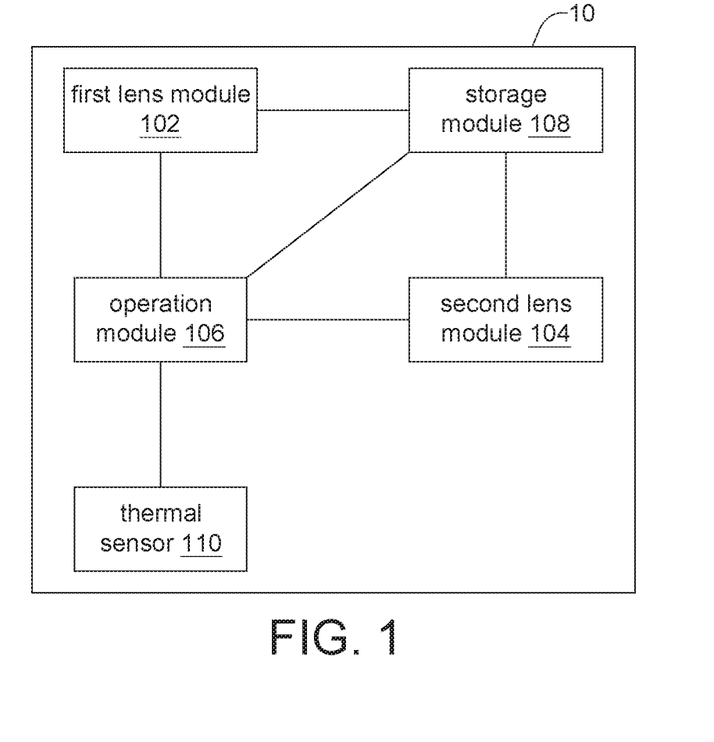
FIG. 1 shows a system block diagram of an image capturing device according to an embodiment of the present invention.

FIG. 1 shows a system block diagram of an image capturing device according to an embodiment of the present invention. As shown in FIG. 1, the image capturing device 10 at least includes a first lens module 102, a second lens module 104, an operation module 106 and a storage module 108. The image capturing device 10 may be, but not limited to, a digital device, a mobile device with multi-lens, a communication device with multi-lens, a panoramic image capturing device, a spherical camera, an action camera, a vehicle image capturing device or an aerial photographing device.

Figure 2:
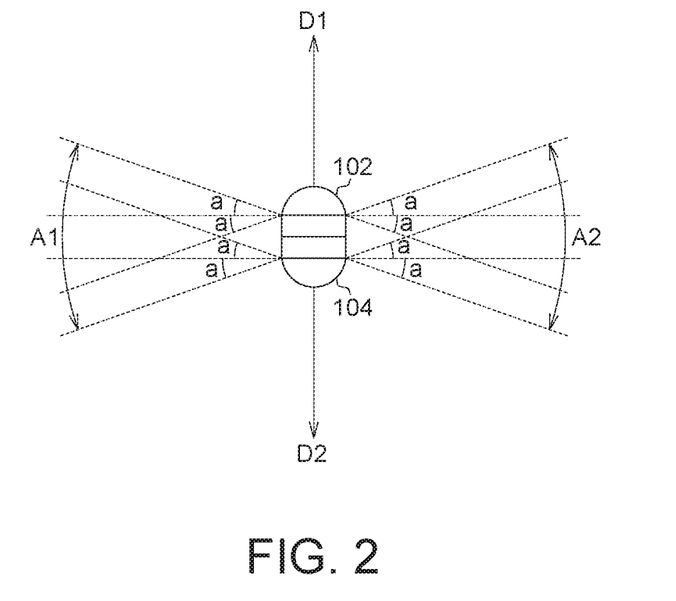
FIG. 2 shows a scheme diagram of an embodiment of field of view of a first lens module and a second lens module of the image capturing device shown in FIG. 1.

FIG. 2 shows a scheme diagram of an embodiment of field of view (FOV) of a first lens module 102 and a second lens module 104 of the image capturing device shown in FIG. 1. As shown in FIG. 2, the first lens module 102 captures a first image toward a first direction D1, and the second lens module 104 captures a second image toward a second direction D2. The first direction D1 may be different from the second direction D2. That is, the included angle between the first direction D1 and the second direction D2 is θ°, where 0<θ≤180. A horizontal dotted line in the left side of the first direction D1 is defined as 0 degree, and a horizontal dotted line in the right side of the first direction D1 is defined as 180 degree, herein.

In an embodiment, the included angel between the first direction D1 and the second direction D2 may substantially be, but not limited to, 180 degrees (i.e., θ°≒180 degrees). The FOV of the first lens module 102 and the second lens module 104 may greater than 180 degrees. For example, the FOV of the first lens module 102 and the second lens module 104 are both (180+2a) degrees, where "a" is a real number greater than 0. In an embodiment, "a" is 4.24 substantially. In the embodiment, the first lens module 102 provides a first image IMG1, and the second lens module 104 provides a second image IMG2. In an embodiment, the first image IMG1 and/or the second image IMG2 may have 3052 pixels in longitudinal direction, and may have 3200 pixels in transverse direction.

The operation module 106 is electrically coupled to the first lens module 102, the second lens module 104 and the storage module 108. The operation module 106 may process the first image IMG1 and the second IMG2, and obtain a third image IMG3.

The storage module 108 is electrically coupled to the first lens module 102, the second lens module 104 and the operation module 106. The first image IMG1, the second image IMG2, the third image IMG3, configuration data and electrical parameters of the image capturing device 10 may be stored in the storage module 108, wherein the storage module 108 may include a hard disk (not shown) and/or a memory (not shown), but the present invention is not limited by. In another embodiment, at least one of the first image IMG1, the second image IMG2 and the third image IMG3 may be stored in a RAM (not shown); in another embodiment, the storage module 108 includes at least one memory (not shown).

Figure 3:
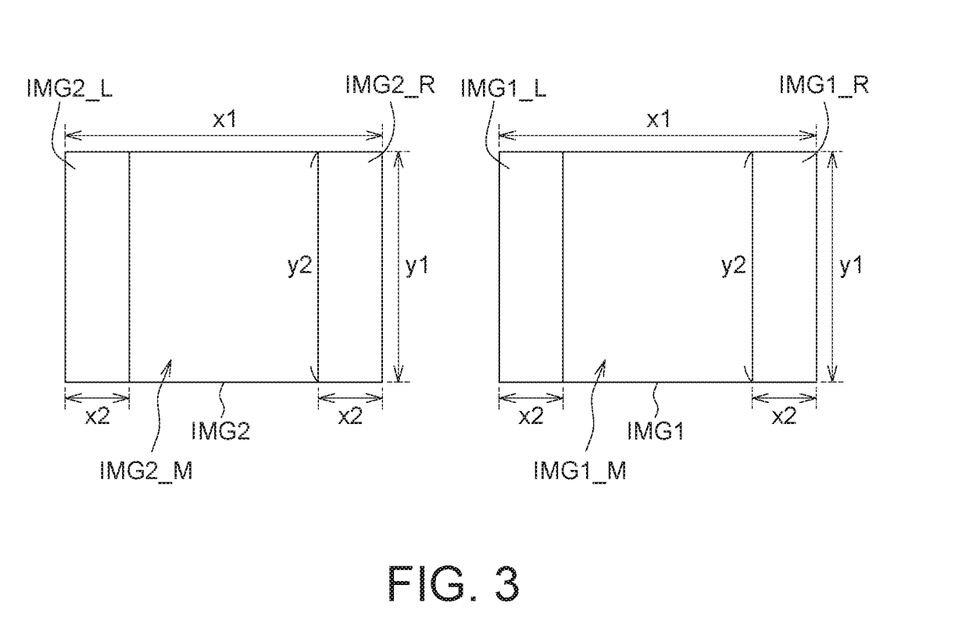
FIG. 3 shows a scheme diagram of a first image and a second image.

FIG. 3 is a scheme diagram of the first image IMG1 and the second image IMG2. Referring to FIG. 2 and FIG. 3 simultaneously, if the first lens module 102 and the second lens module 104 capture images in opposite directions, and θ°≒180 degrees, overlapping regions of the first image IMG1 and the second image IMG2 may be processed to obtain the third image IMG3.

In addition, the first image IMG1 includes a first main block IMG1_M, a first left block IMG1_L and a first right block IMG1_R. The first left block IMG1_L is corresponding to scenery image of FOV between (0−a) degrees and (0+a) degrees captured by the first lens module 102 toward the first direction D1; the first right block IMG1_R is corresponding to scenery image of FOV between (180−a) degrees and (180+a) degrees captured by the first lens module 102 toward the first direction D1; and the first main block IMG1_M is corresponding to scenery image of FOV between (0+a) degrees and (180−a) degrees captured by the first lens module 102 toward the first direction D1.

Similarly, the second image IMG2 includes a second main block IMG2_M, a second left block IMG2_L and a second right block IMG2_R. The second left block IMG2_L is corresponding to scenery image of FOV between (180−a) degrees and (180+a) degrees captured by the second lens module 104 toward the second direction D2; the second right block IMG2_R is corresponding to scenery image of FOV between (0+a) degrees and (0−a) degrees captured by the second lens module 104 toward the second direction D2; and the second main block IMG2_M is corresponding to scenery image of FOV between (0−a) degrees and (180+a) degrees captured by the second lens module 104 toward the second direction D2.

As shown in FIG. 3, in an embodiment, the first lens module 102 and the second lens module 104 have the same FOV in breadth, and the first lens module 102 and the second lens module 104 output the first image IMG1 and the second image IMG2 of the same size respectively. That is, the first image IMG1 and the second image IMG2 both have a width of x1 and a height of y1. Furthermore, in a specific embodiment, the first left block IMG1_L, the first right block IMG1_R, the second left block IMG2_L and the second right block IMG2_R may have the same size. That is, the first left block IMG1_L, the first right block IMG1_R, the second left block IMG2_L and the second right block IMG2_R may have a width of x2 and a height of y2, wherein in the embodiment y2=y1 is taken as an example for illustration, but the present invention is not limited by. In other words, in other embodiments, y2 may be smaller than y1. Based on the first lens module 102 and the second lens module 104 both have FOV of (180+2a) degrees and capture images in opposite direction simultaneously, the first left block IMG1_L and the second right block IMG2_R include a part of scenery image in a first FOV A1, and the first right block IMG1_R and the second left block IMG2_L include a part of scenery image in a second FOV A2. Furthermore, if a thickness between the first lens module 102 and the second lens module 104 becomes smaller and almost can be ignored, the first left block IMG1_L and the second right block IMG2_R show substantially similar image, and the first right block IMG1_R and the second left block IMG2_L show substantially similar image.

Referring to FIG. 1, FIG. 2 and FIG. 3 simultaneously, in an embodiment, the first lens module 102 and the second lens module 104 of the image capturing device 10 capture the first image IMG1 and the second image IMG2 in opposite directions, the third image IMG3 is obtained by image operation and processing by the operation module 106, and the third image IMG3 may be displayed on a display module (not shown) or stored into the storage module 108. In an embodiment, the third image IMG3 is a panoramic or spherical image, for example, a 360 degrees equirectangular image, but the present invention is not limited by. In another embodiment, the third image IMG3 may be a wide image obtained by image operation and processing multiple frames images captured with different shot angles. In such an embodiment, the included angle between the first direction D1 and the second direction D2 may greater than 0 and smaller than 180 degrees (0 degree<θ<180 degrees).

Figure 4A:
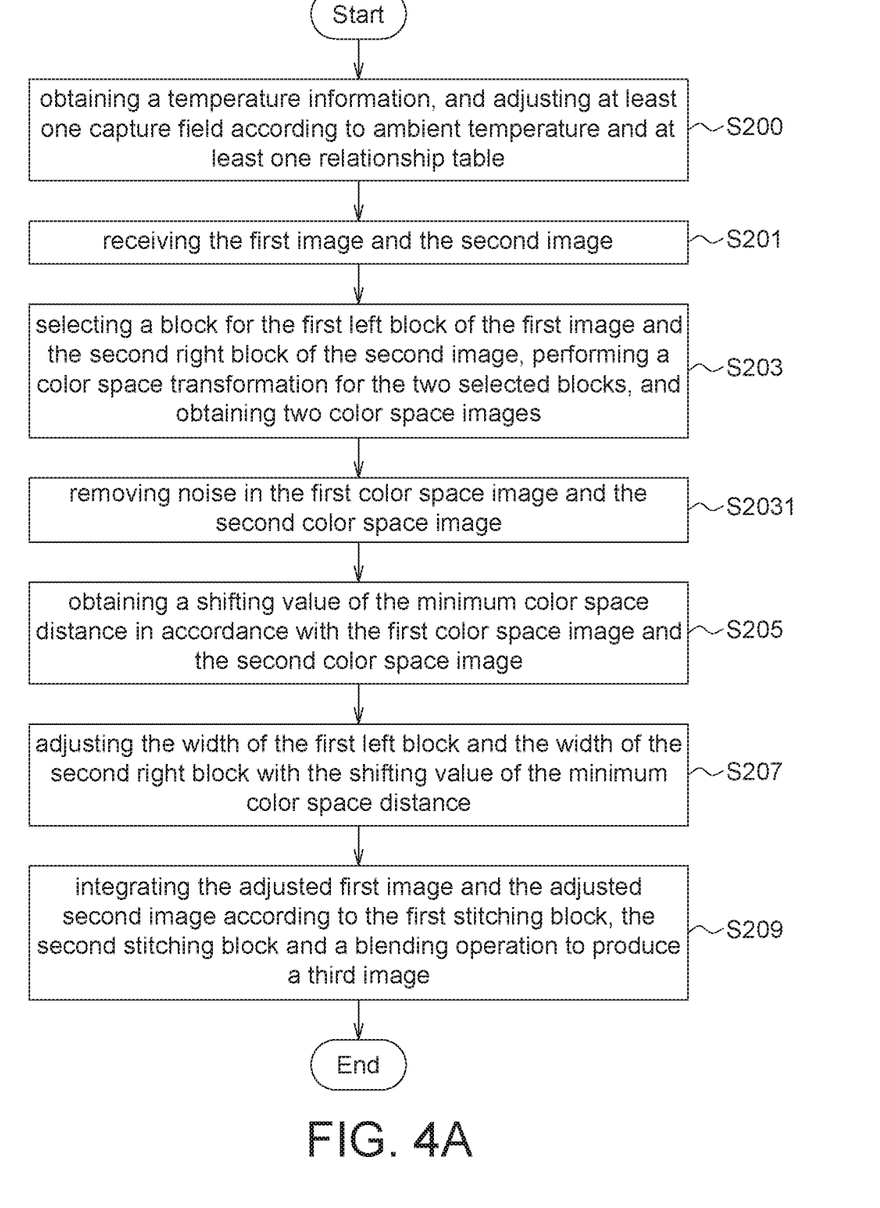
FIG. 4A shows a flowchart of an image processing method according to an embodiment of the present invention.

FIG. 4A shows a flowchart of an image processing method according to an embodiment of the present invention, and FIGS. 5-9 shows scheme diagrams of operations of an image processing method according to an embodiment of the present invention. The image processing method may be adapted to an image processing device which at least includes the operation module 106. The image processing device can at least perform the method shown in FIG. 4-FIG. 9 to perform operation and processing on the first image IMG1 and the second image IMG2, and obtain the third image IMG3. Herein, the image processing device may include but not limit to the image capturing device 10. The image processing device may include no first lens module 102 and/or the second lens module 104. The first image IMG1 and the second image IMG2 may be provided to the operation module 106 by the storage module 108.

Referring FIG. 1 to FIG. 4A simultaneously, as shown in step S201, the first image IMG1 and the second image IMG2 is received by using the operation module 106. The first image IMG1 and the second image IMG2 may come from the first lens module 102 and the second lens module 104 respectively, or come from the storage module 108.

Figure 5:
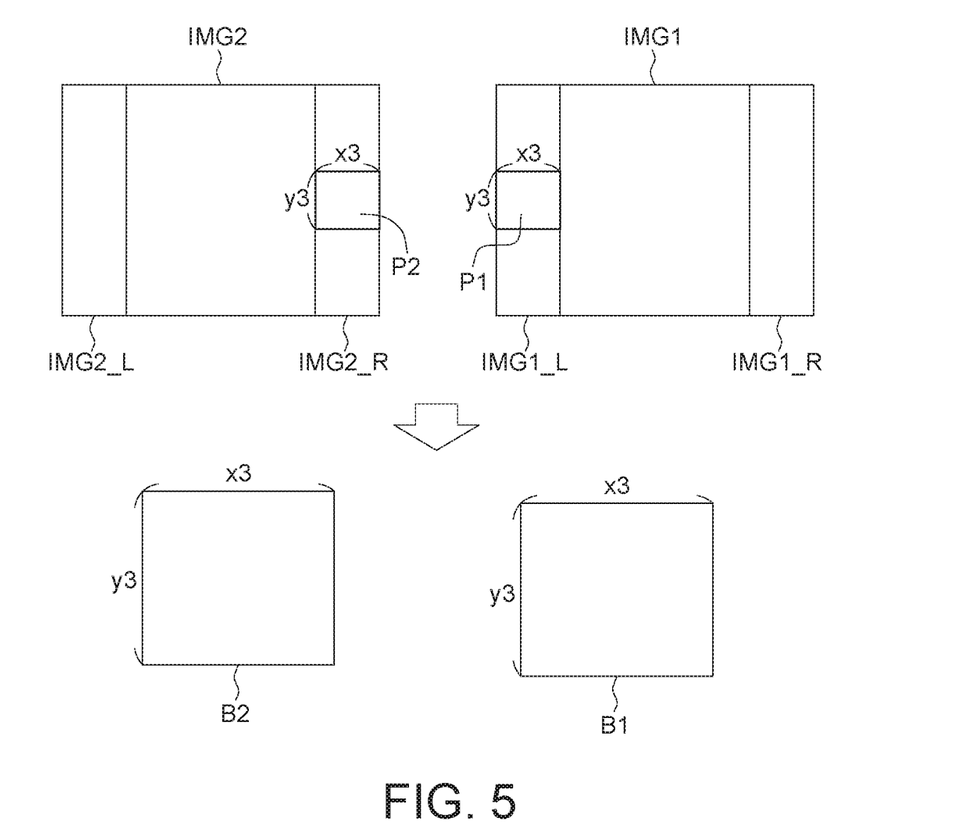
FIGS. 5-9 shows scheme diagrams of operations of an image processing method according to an embodiment of the present invention.

Referring to FIG. 4A and FIG. 5 simultaneously, as shown in step S203, the operation module 106 respectively selects a section for the first left block IMG1_L of the first image IMG1 and the second right block IMG2_R of the second image IMG2, performs a color space transformation for the two selected sections, and obtains two color space images. The color space images may include all or a part of the channel(s) of the color space. For example, the color space may use at one of Y, U, V for defining pixels, wherein Y is a luminance parameter, U and V are chrominance parameters respectively. In an embodiment, the color space images may include Y, U and V channels, that is, each of the pixels of the color space images includes parameters of Y, U and V. in another embodiment, the pixels of the color space images may only include luminance parameter (i.e., Y), which means that the color space consists of luminance value, so that the color space images are grayscale images. Herein, an image which has pixels defined by Y, U and V is called a YUV image.

In the embodiment, the color space images are binary images, for illustration. A first section P1 is selected from the first left block IMG1_L and a binary transformation is performed for the first section P1 to obtain a first color space image B1; and a second section P2 is selected from the second right block IMG2_R and the binary transformation is performed for the second section P2 to obtain a second color space image B2. In this embodiment, the first color space image B1 may be a first binary image, and the second color space image B2 may be a second binary image.

As shown in FIG. 5, in a specific embodiment, the first section P1 and the second section P2 are symmetrically selected from the first left block IMG1_L and the second right block IMG2_R, wherein the first section P1 and the second section P2 have a width of x3 and a height of y3. An average value of luminance is obtained by performing calculation for each of the pixels of the first section P1, and a first threshold is defined thereby; and then, the first threshold is compared with the pixels of the first section P1 respectively to obtain the first color space image B1. In the embodiment, if the luminance value of a pixel is greater than the first threshold, a parameter of the corresponding pixel of the first color space image B1 is set to "1;" if the luminance value of a pixel is smaller than or equals to the first threshold, the parameter of the corresponding pixel of the first color space image B1 is set to "0."

Similarly, an average value of luminance is obtained by performing calculation for each of the pixels of the second section P2, and a second threshold is defined thereby. The second threshold is compared with the pixels of the second section P2 respectively to obtain the second color space image B2. In the embodiment, if the luminance value of a pixel is greater than the second threshold, a parameter of the corresponding pixel of the second color space image B2 is set to "1;" if the luminance value of a pixel is smaller than or equals to the second threshold, the parameter of the corresponding pixel of the second color space image B2 is set to "0."

In an embodiment, step S205 may be performed when step S203 is finished. In another embodiment, step S2031 may be performed after step S203. In step S2031, removing/reducing noise in the first color space image B1 and the second color space image B2, that is, a noise removing process is performed. In the embodiment, for the first color space image B1 and the second color space image B2 being binary images, a processing method of removing noise may be performing at least one of erosion process and/or at least one of dilation process. More specifically, the erosion process is for removing noise pixels; and the dilation process is mainly for filling vacant pixels, including but not limited to pixels removed during the erosion process, or vacant pixels caused by any other reason. In an specific embodiment, two times of the erosion process and/or one time of dilation process is performed for the first color space image B1 and/or the second color space image B2.

Noted that, referring to FIG. 2 and FIG. 3, in the embodiment, the illustration is made by employing the first left block IMG1_L and the second right block IMG2_R corresponding to the first FOV A1. However, the present invention is not limited to performing operation based on the first left block IMG1_L and the second right block IMG2_R, the first right block IMG1_R and the second left block IMG2_L corresponding to the second FOV A2 may also be employed for operation in practice. On the other hand, if the first image IMG1 and the second image IMG2 are rotated or flipped, the basis of the operation can also be changed accordingly.

In step S205, the operation module 106 may obtain a shifting value of the minimum color space distance d_min in accordance with the first color space image B1 and the second color space image B2. In detail, step S205 includes steps S2051-S2055.

Figure 4B:
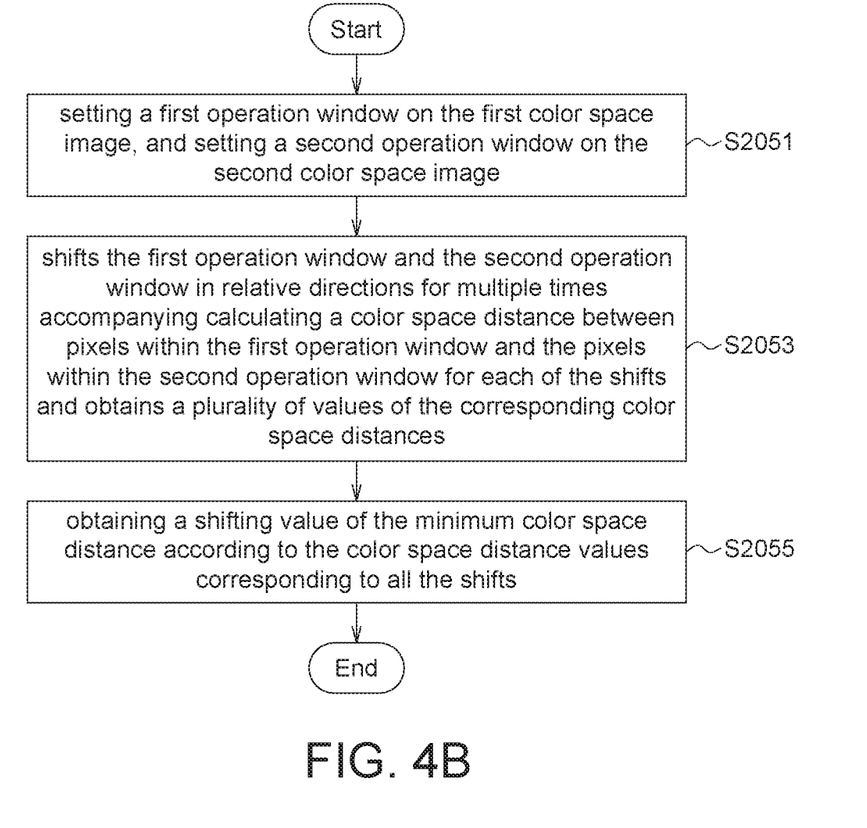
FIG. 4B shows an flowchart of details of step S205 of the image processing method according to an embodiment of the present invention.
Figure 6:
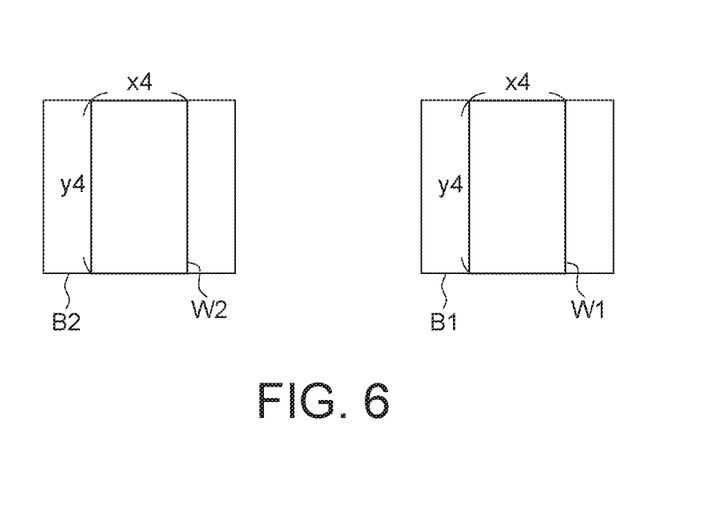

Referring to FIG. 4B and FIG. 6 simultaneously, in step S2051, setting a first operation window W1 on the first color space image B1, and setting a second operation window W2 on the second color space image B2 is performed. The size of the first operation window W1 and the second operation window W2 may be preset to a default value and stored in the storage module 108, or may be determined according to the size of the first color space image B1 and the second color space image B2. In an embodiment, the first operation window W1 has a width of x4, which is one (m2)th of the width x2 of the first left block IMG1_L (i.e., x4=x2*1/m2), and the first operation window W1 has a height of y4, which is one (n2)th of the height y2 of the first left block IMG1_L (i.e., y4=y2*1/n2). Similarly, the second operation window W2 has a width of x4, which is one (m3)th of the width x2 of the second right block IMG2_R (i.e., x4=x2*1/m3), and the second operation window W2 has a height of y4, which is one (n3)th of the height y2 of the second right block IMG2_R (i.e., y4=y2*1/n3). Herein, m2 may be 2, n2 may be 4, m3 may be 2 and n3 may be 4, but the present invention is not limited by these exemplary values.

In step S2053, the operation module 106 shifts the first operation window and the second operation window in relative directions for multiple times accompanying calculating a color space distance between pixels within the first operation window and the pixels within the second operation window for each of the shifts and obtains a plurality of values of the corresponding color space distances. More specifically, a shifting value z is shifted by, in each of the shifts. A color space distance between the pixels within the shifted first operation window W1 and the pixels within the shifted second operation window W2 after each of the shifts is calculating to obtain a plurality of color space distances. In an embodiment, the first color space image B1 and the second color space image B2 are YUV images (i.e., the pixels of the first color space image B1 and the second color space image B2 are defined by parameters of Y, U and V), the color space distance may be Euclidean distance. In another embodiment, the first color space image B1 and the second color space image B2 are binary images, the color space distance may be Hamming distance. Herein, the first operation window W1 and the second operation window W2 are shifted and calculated simultaneously, and the first operation window W1 and the second operation window W2 are shifted in relative directions.

Figure 7:
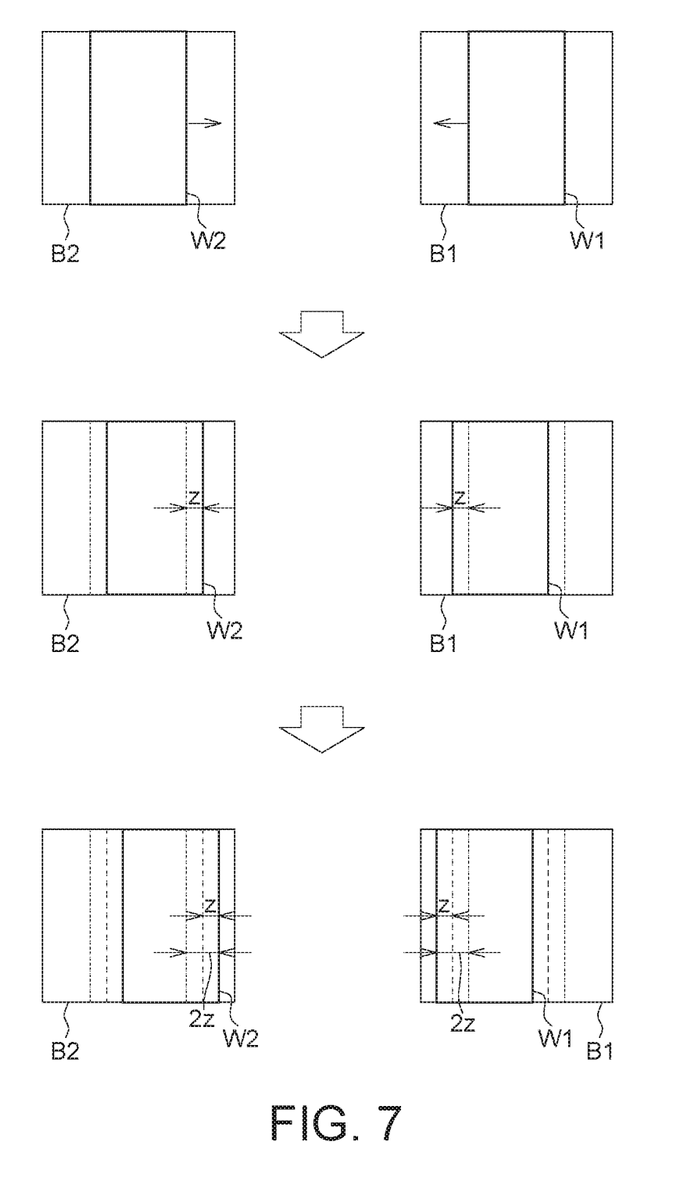

For example, referring to FIG. 4B and FIG. 7 simultaneously, firstly, the operation first window W1 and the second operation window W2 is respectively set at the center of the first color space image B1 and the second color space image B2, and a first calculation is performed to obtain a first color space distance d_1; after the first calculation, the first operation window W1 is shifted by the shifting value z in a direction away from the first main block IMG1_M, the second operation window W2 is shifted by the shifting value z in a direction away from the second main block IMG2_M, and then a calculation is performed to obtain a second color space distance d_2 corresponding to the first shift; then a second shift is performed, that is, the first operation window W1 and the second operation window W2 is respectively shifted by a total shifting value 2z away from the initial position, and a calculation is performed again to obtain a third color space distance d_3, and so forth. In an embodiment, all the color space distances are Hamming distances. The Hamming distance between the pixels in the first operation window W1 and the pixels in the second operation window W2 may be calculated by performing XOR operation on the pixels at the corresponding position in the first operation window W1 and the second operation window W2 (e.g., the two pixels at the same position in the first operation window W1 and the second operation window W2), and calculating the amount of "1" (i.e., the total amount of "1" is the Hamming distance).

In step S2055, the operation module 106 obtains a shifting value of the minimum color space distance d_min according to the color space distance values corresponding to all the shifts, wherein the shifting value of the minimum color space distance d_min equals to the total shifting value of the shift which has the smallest color space distance among all the shifts. For example, assuming that the color space distance d_10 between the pixels within the first operation window W1 and the pixels within the second operation window W1 the tenth shift is the smallest one of all the color space distances, then the shifting value of the minimum color space distance d_min equals to the total shifting value of the tenth shift, that is, 10 z.

Referring to FIG. 4A again, in step S207 the operation module 106 adjusts the width of the first left block IMG1_L and the width of the second right block IMG2_R with the shifting value of the minimum color space distance d_min.

In an embodiment of width adjusting, the width of the first left block IMG1_L of the first image IMG1 and the width of the second right block IMG2_R of the second image IMG2 is compressed, a first stitching block S1 is set in the adjusted first left block IMG1_L of the first image IMG1, and a second stitching block S2 is set in the adjusted second right block IMG2_R of the second image IMG2, according to the shifting value of the minimum color space distance d_min.

Figure 8:
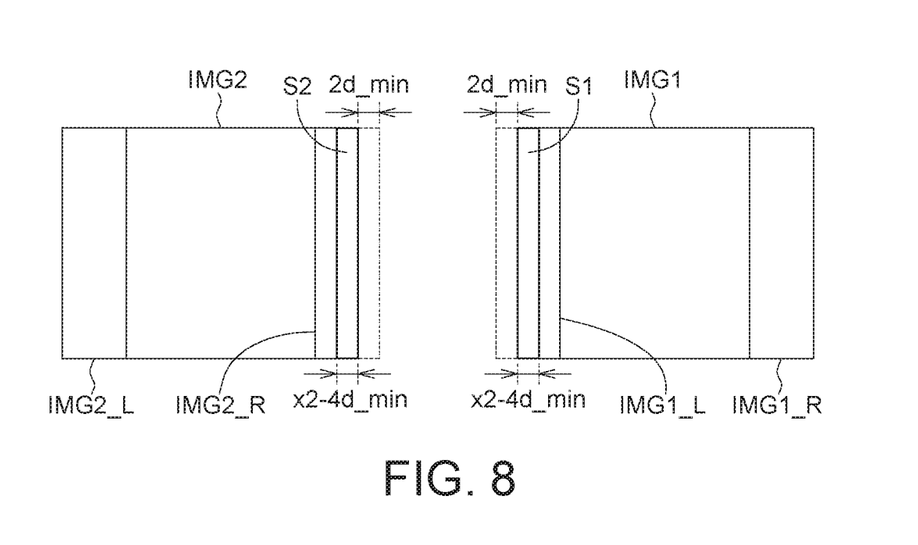

Referring to FIG. 4A and FIG. 8 simultaneously, in detail, the first left block IMG1_L of the first image IMG1 is compressed by an amount of twice of the shifting value of the minimum color space distance d_min (i.e., (2*d_min) pixels) in a direction forward to the first right block IMG1_R. That is, the width x2 of the first left block IMG1_L is compressed to (x2−2*d_min), and the height y1 remains unchanged in the embodiment. Similarly, the second right block IMG2_R of the second image IMG2 is compressed by an amount of twice of the shifting value of the minimum color space distance d_min (i.e., (2*d_min) pixels) in a direction forward to the second left block IMG2_L. That is, the width x2 of the second right block IMG2_R is compressed to (x2−2*d_min), and the height y1 remains unchanged in the embodiment.

In the embodiment, the first stitching block S1 is a block with a width of (x2−4*d_min) and a height of y1 from an outer edge of the compressed first left block IMG1_L (i.e., the edge away from the first main block IMG1_M). Similarly, the second stitching block S2 is a block with a width of (x2−4*d_min) and a height of y1 from an outer edge of the compressed second right block IMG2_R (i.e., the edge away from the second main block IMG2_M).

In another embodiment of width adjusting, the width of the first left block IMG1_L of the first image IMG1 and the width of the second right block IMG2_R of the second image IMG2 is enlarged, a first stitching block S1 is set in the adjusted first left block IMG1_L of the first image IMG1, and a second stitching block S2 is set in the adjusted second right block IMG2_R of the second image IMG2, according to the shifting value of the minimum color space distance d_min.

In yet another embodiment of width adjusting, the width of the first left block IMG1_L of the first image IMG1 and the width of the second right block IMG2_R of the second image IMG2 is compressed or enlarged, a first stitching block S1 is set in the adjusted first left block IMG1_L of the first image IMG1, and a second stitching block S2 is set in the adjusted second right block IMG2_R of the second image IMG2, according to the shifting value of the minimum color space distance d_min.

In step S209, the operation module 106 integrates the adjusted first image IMG1 and the adjusted second image IMG2 according to the first stitching block S1, the second stitching block S2 and a blending operation to produce a third image IMG3.

Figure 9:
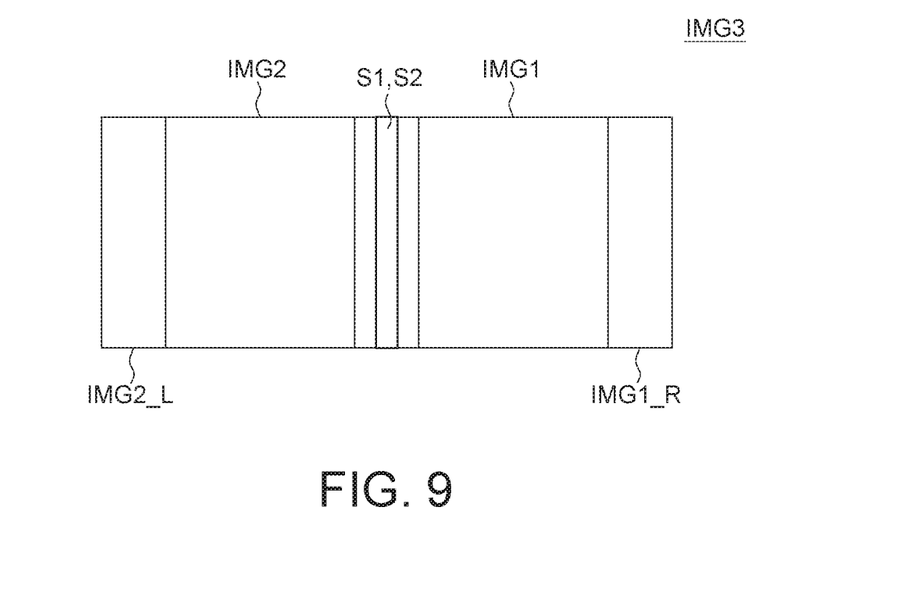

Referring to FIG. 4A and FIG. 9 simultaneously, the first stitching block S1 of the adjust first image IMG1 and the second stitching block S2 of the adjusted second image IMG2 is stitched by using the blending operation (e.g., α-blending), and the third image IMG3 is obtained. In other words, the third image IMG3 includes scene shown in the first image IMG1 and the second image IMG2, which is a 360-degree scene surrounding the image capturing device 10 in this embodiment. In addition, in an embodiment, the first image IMG1 and the second image IMG2 may be current real-time images of the first lens module 102 and the second lens module 104 respectively, and the third image IMG3 may be displayed on the display module immediately or be stored into the storage module 108 after the third image IMG3 is produced.

In an embodiment, in a preview mode of the image capturing device 10, the first lens module 102 and the second lens module 104 may capture an image stream of multiple frames of the first images IMG1 and an image stream of multiple frames of the second images IMG2 respectively. The operation module 106 performs operation for the multiple frames of the first images IMG1 and the multiple frames of the second images IMG2, and then outputs multiple frames of the third image IMG3, that is, the third image IMG3 may be a real-time preview image or a frame of a recording/recorded video, wherein the third image IMG3 is obtained by operating the first image IMG1 and the second image IMG2 which are captured at substantially the same time. That is, the first lens module 102 and the second lens module 104 may capture the first image IMG1$x$ and the second image IMG2$x$ which at a moment tx, and the operation module 106 produces the third image IMG3$x$ according to the first image IMG1$x$ and the second image IMG2$x$. Furthermore, in the preview mode or a video mode, the operation module 106 may derive the third image IMG3$x$ synchronously when the first image IMG1$x$ and the second image IMG2$x$ are produced. However, in another embodiment, in the video mode, the operation module 106 may derive an image stream of the third image IMG3 after the image stream of the first image IMG1 and the image stream of the second image IMG2 have been captured, so that the fluency during video recording may be held. However, the invention is not limited thereby.

In the embodiment, when selecting a section for the first left block of the first image for performing the color space transformation to obtain the first color space image B1 is performed, a size of the selected section is the same as the size of the first color space image B1 (with width of x3 and height of y3), as well as obtaining the second color space image B2. In an embodiment, the center of the selected section is coincident with the center of the first left block IMG1_L. in another embodiment, depending on the needs or specifications of hardware, the location and size of the selected section is not limited. For example, the selected section may be set according to an area covered by shifting the first operation window W1 and the second operation window W2 for several times. Thereby the amount of calculation when converting to the color space images can be reduced.

In another embodiment, the FOV of the first lens module 102 and the FOV of the second lens module 104 are 188.48 degrees (i.e., a=4.24). The first image IMG1 and the second image IMG2 have the width x1 of 3200 pixels and the height y1 of the 3056 pixels. The first left block IMG1_L, the first right block IMG1_R, the second left block IMG2_L and the second right block IMG2_R have the width x2 of 144 pixels and the height y2 of 3056 pixels. The first color space image B1 and the second color space image B2 obtained by the binary transformation have the width x3 of 144 pixels and the height y3 of the 764 pixels. The first operation window W1 and the second operation window have the width x4 of 72 pixels and the height y4 of 764 pixels. The shifting value z is 1 pixel, and the number of the shifts is 20.

In this embodiment, it may be assumed that in the 20th shift of the first window W1 and the second window W2, the Hamming distance between the pixels in the first window W1 and the pixels in the second window W2 is the smallest of all the (20) shifts. The minimum color space distance d_min equals to the total shifting value in the 20th shift, that is, 20 pixels. The first left block IMG1_L and the second right block IMG2_R may be adjusted/compressed to have the width of 104 pixels and the height of 3056 pixels. The first stitching block S1 and the second stitching block S2 have the width of 64 pixels and the height of 3056 pixels.

Then, the third image IMG3 may be obtained by integrating/stitching the first stitching block S1 of the first image IMG1 and the second stitching block S2 of the second image IMG2, by using, for example, α-blending.

In different embodiments, the first lens module 102 and the second lens module 104 may be fisheye lens modules; the first image IMG1 and the second image IMG2 may be fisheye images, equirectangular projection images, cylindrical projection images or cubic projection images.

In an embodiment, the image capturing device 10 may further include a thermal sensor 110, electrically coupled to the operation module 106. The thermal sensor 110 may perform sensing and provide a temperature information. The operation module 106 may adjust at least one capturing field according to the temperature information and a default value. The temperature information includes, but not limited to, ambient temperature and/or temperature in the image capturing device. The default value may be a preset value, stored in the storage module 108, and the default value may be, but not limited to, a relationship table, a temperature adjusting formula.

In addition, in the image processing method, a step S200 may further included before step S201. In step S200, obtaining a temperature information, and adjusting at least one capturing field according to ambient temperature and at least one relationship table is performed, wherein the at least one relationship table show a relationship between the amount of pixels in a FOV180-degree reference line of the first lens module 102 and/or the second lens module 104 and ambient temperature. The capturing field is used for the first lens module 102 and/or the second lens module 104 to capture image to obtain the first image IMG1 and/or the second image IMG2.

In an embodiment, the relationship table may be pre-stored in the storage module 108. In detail, the relationship table may be produced by following approach. First, measure the number of pixels in the FOV180-degree reference line at different temperatures of the first lens module 102 and/or the second lens module 104. A number of measurements are repeated at different ambient temperatures, and the results collected statistically. Next, a relational table is generated based on statistical measurement results by using a minimum regression manner.

According to the image capturing device and the image processing method of the present invention, the first image IMG1 produced by the first lens module 102 and the second image IMG2 produced by the second lens module 104 are integrated to obtain a third image, thereby the third image IMG3 may be able to show a 360-degree scene around the image capturing device 10. In addition, by using the relationship table showing the relationship between the amount of pixels in the FOV180-degree reference line and the ambient temperature, the distortion of the first image IMG1 and the second image IMG2 when the first lens module 102 and/or the second lens module 104 is affected by ambient temperature can be avoided. Thereby the quality of the third image IMG3 can be improved.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image capturing device, comprising:
a first lens module, capturing a first image toward a first direction, and the first image having a first left block;
a second lens module, capturing a second image toward a second direction, and the second image having a second right block; and
an operation module, electrically coupled to the first lens module and the second lens module, and transforming a first section of the first left block to a first color space image and transforming a second section of the second right block to a second color space image; obtaining a shifting value of a minimum color space distance in accordance with the first color space image and the second color space image; adjusting a width of the first left block and a width of the second right block with the shifting value of the minimum color space distance; and, setting a first stitching block on the adjusted first left block and setting a second stitching block on the adjusted second right block, and calculating the first stitching block and the second stitching block with a blending operation and producing a third image.

2. The image capturing device according to claim 1, wherein the operation module sets a first operation window on the first color space image and a second operation window on the second color space image; shifts the first operation window and the second operation window in relative directions for multiple times accompanying calculating a color space distance between pixels within the first operation window and the pixels within the second operation window for each of the shifts, and obtains a plurality of values of the corresponding color space distances; and obtains the shifting value of the minimum color space distance in accordance with the values of the corresponding color space distance.

3. The image capturing device according to claim 2, wherein the shifting value of the minimum color space distance is a total shifting value of the shift which has the smallest value of the shifting values of the corresponding color space distance.

4. The image capturing device according to claim 1, further comprising a thermal sensor, the thermal sensor providing a temperature information to the operation module.

5. The image capturing device according to claim 4, wherein the operation module adjusts a capturing field with the temperature information, and the first lens module and/or the second lens module capture the first image and/or the second image in accordance with the capturing field.

6. The image capturing device according to claim 1, further comprising a display module and/or a storage module, the display module displaying at least one of the first image, the second image and the third image, and the storage module storing at least one of the first image, the second image and the third image.

7. The image capturing device according to claim 1, wherein the operation module further removes at least one noise pixel of the first color space image and/or the second color space image, and/or further fills at least one vacant pixel of the first color space image and/or the second color space image.

8. The image capturing device according to claim 1, wherein an included angle between the first direction and the second direction is $\theta°$, and $0<\theta\leq180$.

9. An image processing method, for an electronic device having an operation module, the image processing method comprising:

providing a first image and a second image to the operation module, the first image having a first left block, and the second image having a second right block; and
adopting the operation module to transform a first section of the first left block to a first color space image and to transform a second section of the second right block to a second color space image; to obtain a shifting value of a minimum color space distance in accordance with the first color space image and the second color space image; to adjust a width of the first left block and a width of the second right block with the shifting value of the minimum color space distance; to set a first stitching block on the adjusted first left block and to set a second stitching block on the adjusted second right block; and, to calculate the first stitching block and the second stitching block with a blending operation and to produce a third image.

10. The image processing method according to claim 9, further comprising: setting a first operation window on the first color space image, and setting a second operation window on the second color space image; shifting the first operation window and the second operation window in relative directions for multiple times accompanying calculating a color space distance between pixels within the first operation window and the pixels within the second operation window for each of the shifts and obtains a plurality of corresponding shifting values of the color space distances; and, obtaining the shifting value from the minimum color space distances.

11. The image processing method according to claim 9, wherein before the step of providing the first image and the second image, further comprises: obtaining a temperature information, adjusting a capturing field with the temperature information, and obtaining the first image and/or the second image according to the capturing field.

12. The image processing method according to claim 9, further comprising: removing noise for the first color space image and/or the second color space image before setting the first operation window and/or setting the second operation window.

13. The image processing method according to claim 12, wherein the removing noise comprises performing at least one of erosion process and/or at least one of dilation process.

14. The image processing method according to claim 13, wherein the erosion process is to remove at least one noise pixel, and the dilation process is to fill at least one vacant pixel.

15. An image processing device, comprising: a storage module, storing at least one first image and at least one second image, the first image having a first left block, and the second image having a second right block; and an operation module, transforming a first section of the first left block to a first color space image and transforming a second section of the second right block to a second color space image; obtaining a shifting value of a minimum color space distance in accordance with the first color space image and the second color space image; adjusting a width of the first left block and a width of the second right block with the shifting value of the minimum color space distance; setting a first stitching block on the adjusted first left block and setting a second stitching block on the adjusted second right block; and calculating the first stitching block and the second stitching block with a blending operation and producing at least one third image.

16. The image processing device according to claim 15, wherein the operation module sets a first operation window on the first color space image and a second operation window on the second color space image; shifts the first operation window and the second operation window in relative directions for multiple times accompanying calculating a color space distance between pixels within the first operation window and within the second operation window and obtaining a plurality of corresponding shifting values of the color space distances; and, obtains the shifting value of the minimum color space distance with the plurality of corresponding shifting values of the color space distances.

17. The image processing device according to claim 15, further comprising a thermal sensor, the thermal sensor providing a temperature information to the operation module, the operation module adjusting a capturing field in accordance with the temperature information, and a first lens module and/or a second lens module capturing the first image and/or the second image with the capturing field.

18. The image processing device according to claim 15, wherein the operation module further removes at least one noise pixel of the first color space image and/or the second color space image, and/or further fills at least one of vacant pixel of the first color space image and/or the second color space image.

19. The image processing device according to claim 15, further comprising: a display module, the display module displaying at least one of the first image, the second image and the at least one third image; and/or the storage module storing at least one of the first image, the second image and the at least one third image.

20. The image processing device according to claim 15, wherein the at least one third image is a real-time preview image or is a frame of a video.

* * * * *